(12) United States Patent
Chou et al.

(10) Patent No.: US 9,184,604 B2
(45) Date of Patent: Nov. 10, 2015

(54) CHARGING METHODS OF DETACHABLE ELECTRONIC DEVICES

(71) Applicant: Wistron Corp., New Taipei (TW)

(72) Inventors: Ying-Tzu Chou, New Taipei (TW); Chun-Ta Lee, New Taipei (TW)

(73) Assignee: WISTRON CORP., New Taipei (TW)

( * ) Notice: Subject to any disclaimer, the term of this patent is extended or adjusted under 35 U.S.C. 154(b) by 175 days.

(21) Appl. No.: 14/073,131

(22) Filed: Nov. 6, 2013

(65) Prior Publication Data

US 2014/0312854 A1    Oct. 23, 2014

(30) Foreign Application Priority Data

Apr. 23, 2013   (TW) ............................. 102114318 A

(51) Int. Cl.
*H02J 7/00* (2006.01)
(52) U.S. Cl.
CPC .................................... *H02J 7/0013* (2013.01)
(58) Field of Classification Search
CPC ...................................................... H02J 7/0022
USPC ............................................................... 320/157
See application file for complete search history.

(56) References Cited

U.S. PATENT DOCUMENTS

| | | | |
|---|---|---|---|
| 6,304,062 B1 | 10/2001 | Batson | |
| 8,909,838 B2 * | 12/2014 | Hsu et al. ...................... | 710/303 |
| 2005/0189922 A1 | 9/2005 | Maskatia et al. | |
| 2006/0067037 A1 * | 3/2006 | Yin ................................ | 361/683 |
| 2006/0071916 A1 * | 4/2006 | Jeun et al. ..................... | 345/179 |
| 2007/0120525 A1 * | 5/2007 | Tsuji ............................. | 320/110 |
| 2010/0066305 A1 * | 3/2010 | Takahashi et al. ............ | 320/108 |
| 2013/0038297 A1 | 2/2013 | Sang et al. | |
| 2013/0258830 A1 * | 10/2013 | Yoda ......................... | 369/53.42 |
| 2013/0328399 A1 * | 12/2013 | Suzuki et al. ................... | 307/29 |
| 2014/0147157 A1 * | 5/2014 | Hiraguchi et al. .............. | 399/88 |
| 2015/0035369 A1 * | 2/2015 | He et al. .......................... | 307/66 |
| 2015/0171660 A1 * | 6/2015 | Itou et al. ..................... | 320/108 |
| 2015/0180270 A1 * | 6/2015 | Takano ........................ | 320/108 |
| 2015/0236536 A1 * | 8/2015 | Aradachi et al. ............. | 320/108 |

OTHER PUBLICATIONS

Taiwanese language office action dated Oct. 29, 2014.
English language translation of relevant paragraphs of Taiwan Office Action.

* cited by examiner

*Primary Examiner* — Suchin Parihar
(74) *Attorney, Agent, or Firm* — McClure, Qualey & Rodack, LLP

(57) ABSTRACT

An electronic device includes a first battery, a first charging unit, a first voltage adjustment unit, a power detection module, and a first control module. The first charging unit charges the first battery according to a supply voltage and a first charging enable signal. The first voltage adjustment unit outputs a first output voltage according to the supply voltage and a first battery voltage of the first battery. The power detection module generates a power consumption information according to the first output voltage. The first control module sets a charging time according to the supply voltage and the power consumption information, in which the first control module generates the first charging enable signal to control the first charging unit to charge the first battery according to the charging time.

12 Claims, 7 Drawing Sheets

CHARGING METHODS OF DETACHABLE ELECTRONIC DEVICES

CROSS REFERENCE TO RELATED APPLICATIONS

This application claims priority of Taiwan Patent Application No. 102114318, filed on Apr. 23, 2013, the entirety of which is incorporated by reference herein.

BACKGROUND OF THE INVENTION

1. Field of the Invention

The disclosure relates generally to electronic devices and charging methods, and more particularly, relates to charging methods for detachable electronic devices.

2. Description of the Related Art

With the rapid progress of science and technology, electronic devices are becoming increasingly diverse. With the popularity of tablets growing, more and more laptops are offering detachable functions.

However, when the display and the body of a laptop are detachable, charging of the separate parts becomes a challenge. Assuming that it takes 23 hours to charge a battery, because both the display and the body of a laptop must comprise a battery, the amount of time for charging both, undetached, would take 46 hours. To make sure both batteries are fully charged, a software method is usually applied, wherein a safety timer is set to 48 hours, such that charging is automatically stopped after 48 hours. However, the method is dangerous, when the battery being charged malfunctions, and charging is not stopped.

BRIEF SUMMARY OF THE INVENTION

To solve above problems, the invention provides an electronic device comprising a first device which comprises: a first battery; a first charging unit, charging the first battery according to a supply voltage and a first charging enable signal; a first voltage adjustment unit, outputting a first output voltage according to the supply voltage and a first battery voltage of the first battery; a power detection module, generating a power consumption information according to the first output voltage; and a first control module, setting a charging time according to the supply voltage and the power consumption information, wherein the first control module generates the first charging enable signal to control the first charging unit to charge the first battery according to the charging time.

An embodiment of the electronic device further comprises a multiplexer selectively outputting the supply voltage or the first battery voltage to the first voltage adjustment unit, wherein the multiplexer outputs the supply voltage to the first voltage adjustment unit when the supply voltage is received, and the multiplexer outputs the first battery voltage to the first voltage adjustment unit when the supply voltage is not received.

An embodiment of the electronic device further comprises a second device detachably engaging with the first device, which comprises: a second battery, outputting a second battery voltage; a second charging unit, charging the second battery according to a second charging enable signal and the first output voltage; and a second control module, outputting the second charging enable signal to control the second charging unit to charge the second battery according to the first output voltage and the charging time when the first device and the second device is engaged with each other.

In an embodiment of the electronic device, the first control module sets the charging time according to a lookup table, wherein the lookup table records the power consumption information and the charging time corresponding to the power consumption information.

In an embodiment of the electronic device, the first control module further detects the first battery information of the first battery, and the control module sets the charging time according to the supply voltage, the power consumption information, and the first battery information.

In an embodiment of the electronic device, the second control module further detects the second battery information of the second battery, and the first control module further sets the charging time according to the supply voltage, the power consumption information, the first battery information, and the second battery information.

The invention further provides a charging method, adopted in an electronic device, wherein the electronic device comprises a first device which comprises a first battery, which comprises: determining whether a supply voltage has been provided; charging the first battery according to the supply voltage when the supply voltage has been provided; outputting a first output voltage according to the supply voltage; generating a power consumption information according to the first output voltage by a power detection module; setting the charging time according to the supply voltage and the power consumption information; and charging the first battery according to the charging time.

In an embodiment of the charging method, a first output voltage is outputted according to a first battery voltage of the first battery when the supply voltage has not been provided.

In an embodiment of the charging method, the electronic device further comprises a second device which comprises a second battery, comprising: detecting whether the second device is engaged with the first device; charging the second battery according to the first output voltage and the charging time when the second device is engaged with the first device; and not charging the second battery when the second device is disengaged from the first device.

In an embodiment of the charging method, the charging time is set according to a lookup table which records the power consumption information and the charging time corresponding to the power consumption information.

An embodiment of the charging method further comprises detecting first battery information of the first battery and setting the charging time according to the supply voltage, the power consumption information, and the first battery information.

An embodiment of the charging method further comprises detecting second battery information of the second battery and setting the charging time according to the supply voltage, the power consumption information, the first battery information, and the second battery information.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
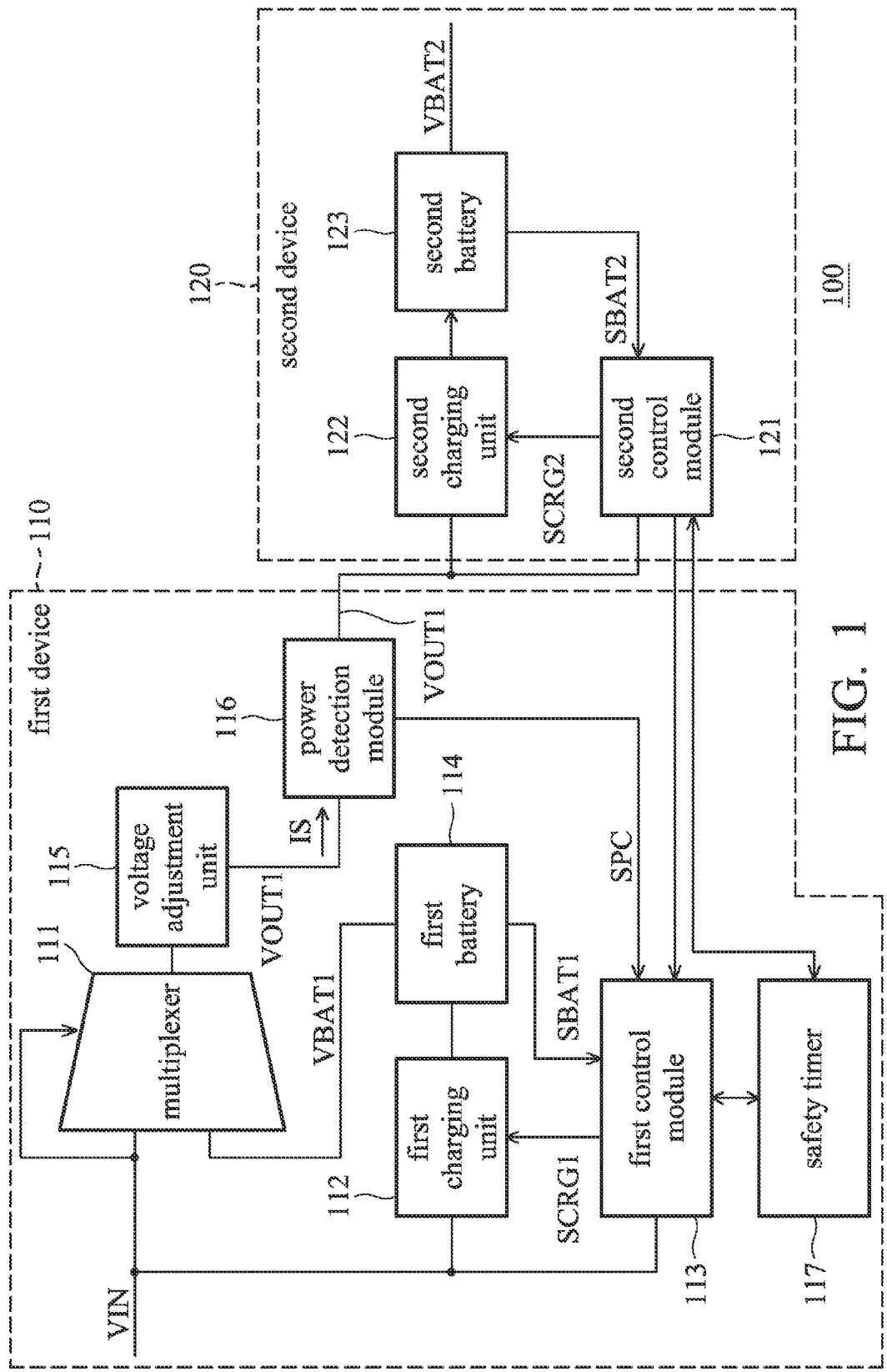
FIG. 1 is a block diagram of an electronic device according to an embodiment of the invention.

FIG. 1 is a block diagram of an electronic device according to an embodiment of the invention. As shown in FIG. 1, the electronic device 100 includes a first device 110 and a second device 120. According to an embodiment of the invention, the electronic device 100 may be a detachable laptop, in which the host and the display of the laptop can be separated from each other. The first device 110 is the host of the detachable laptop, and the second device 120 is the display of the detachable laptop.

The first device 110 receives the supply voltage VIN, and the supply voltage VIN is provided for the multiplexer 111, the first charging unit 112, and the first control module 113. According to an embodiment of the invention, the supply voltage VIN may be provided through a USB (Universal Serial Bus). When the supply voltage VIN is detected by the first control module 113, the first control module 113 notifies the first charging unit 112 to start up and charge the first battery 114. At the same time, when the supply voltage VIN is detected by the multiplexer 111, the multiplexer 111 provides the supply voltage VIN for the voltage adjustment unit 115 to output the first output voltage VOUT1. When the supply voltage VIN is not detected by the multiplexer 111, the multiplexer 111 selects the first battery voltage VBAT1, outputted by the first battery 114, for the voltage adjustment unit 115. The first output voltage VOUT1 is taken as a power source of the inner circuit of the first device 110.

According to an embodiment of the invention, the supply voltage VIN provided through USB is either 5V or 12V. According to an embodiment of the invention, the first battery 114 is a lithium battery, and the maximum output voltage of a lithium battery is 4.2V. Therefore, the voltage value of the supply voltage VIN is different from the voltage value of the first battery voltage VBAT1 that the first battery 114 outputs. The voltage adjustment unit 115 transforms the supply voltage VIN and the first battery voltage VBAT1, which are of different voltage values, into a voltage value that the first device 110 requires, and outputs the system current IS for the first device 110.

The first device 110 further includes the power detection module 116 which is coupled to the output terminal of the voltage adjustment unit 115 for detecting the power consumption information SPC of the first output voltage VOUT1 and transmitting the power consumption information SPC to the first control module 113. The first control module 113 sets the charging time of the safety timer 117 according to the power consumption information SPC. The first control module 113 further generates the first charging enable signal SCRG1 according to the charging time of the safety timer 117, and the first charging unit 112 charges the first battery 114 according to the first charging enable signal SCRG1.

The second device 120 includes the second control module 121, the second charging unit 122, and the second battery 123. According to an embodiment of the invention, the second device 120 may be the display of a detachable laptop. When the display is engaged with the host, the first output voltage VOUT1 is provided for the second device 120 and the system current IS is also provided for the second device 120 at the same time. At this time, the first output voltage VOUT1 is detected by the second control module 121, and the second control module 121 generates the second charging enable signal SCRG2 to control the second charging unit 122 to charge the second battery 123. According to an embodiment of the invention, the second battery voltage VBAT2, outputted by the second battery 123, is provided for the inner circuit of the display, in which the inner circuit of the display includes the backlight module, the CPU (Central Processing Unit), the memory, the chipset, and so on. According to another embodiment of the invention, when the display is not engaged with the host, the second charging enable signal SCRG2 is disabled by the second control module 121 to control the second charging unit 122 to not charge the second battery 123.

According to an embodiment of the invention, the first control module 113 detects the first battery information SBAT1 of the first battery 114, in which the first battery information SBAT1 includes the residual capacity of the first battery 114, the first control module 113 sets the charging time for the safety timer 117 to start a count according to the first battery information SBAT1, the power consumption information SPC, and the supply voltage VIN. When the safety timer 117 finishes counting, the first charging enable signal SCRG1 is disabled by the first control module 113 to stop the charging of the first battery 114 by the first charging unit 112. In addition, the first control module 113, once again, detects whether the first battery information SBAT1 of the first battery 114 indicates that the first battery 114 is not fully charged, wherein if so, the charging time for the safety timer 117 is set again.

According to another embodiment of the invention, the second control module 121 detects the second battery information SBAT2 of the second battery 123, in which the second battery information SBAT2 includes the residual capacity of the second battery 123. The second control module 121 further transmits the second battery information SBAT2 to the first control module 113, and the first control module 113 sets the charging time of the safety timer 117 according to the first battery information SBAT1, the second battery information SBAT2, the power consumption information SPC, and the supply voltage VIN. When the safety timer 117 finishes counting, the first charging enable signal SCRG1 is disabled by the first control module 113 to stop the charging of the first battery 114 by the first charging unit 112, and the second charging enable signal SCRG2 is also disabled by the second control module 121 to stop the charging of the second battery 123 by the second charging unit 122. In addition, the first control module 113 and the second control module 121 respectively detect the first battery information SBAT1 of the first battery 114 and the second battery information SBAT2 of the second battery 123. The charging time of the safety timer 117 is set again if either the first battery 114 or the second battery 123 is not fully charged.

Figure 2:
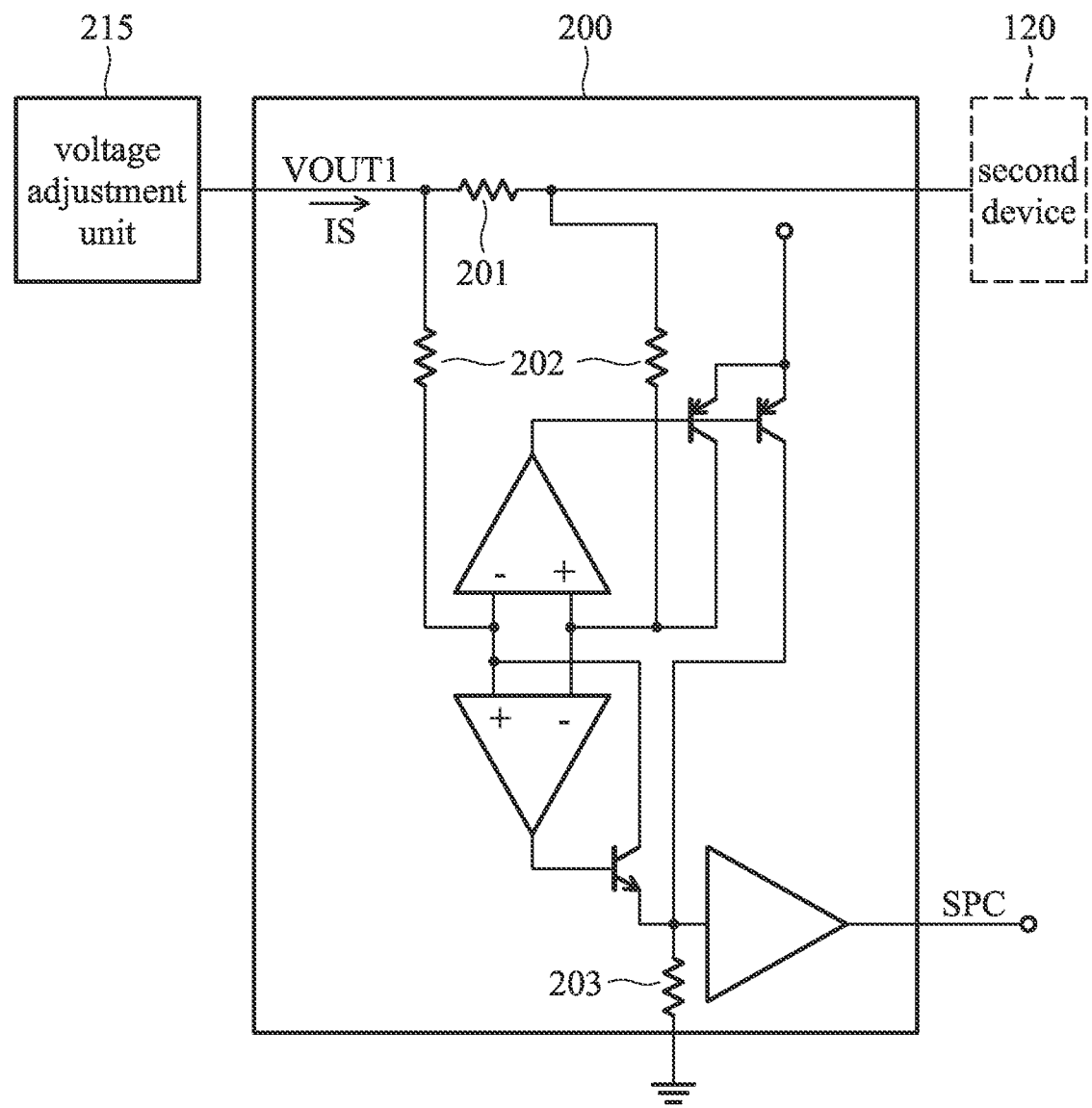
FIG. 2 is a schematic diagram of a power detection module according to an embodiment of the invention.

FIG. 2 is a schematic diagram of a power detection module according to an embodiment of the invention. As shown in FIG. 2, the power detection module 200 detects the current that is flowing through the sensing resistor 201 and determines the power consumption according to the first output voltage VOUT1.

According to an embodiment of the invention, the sensing resistor is 10 mΩ, the first resistor 202 is 5 kΩ, and the second resistor 203 is 100 kΩ, and the sensing resistor 201 is in series with the output terminal of the voltage adjustment unit 215. When the system current IS outputted by the voltage adjustment unit 215 is 1.2 A, according to an embodiment of the invention, the power consumption information SPC is SPC=1.2*10 m*100 k/5 k, that is SPC=0.24V.

Figure 3:
FIG. 3 is a table of system current and charging time according to an embodiment of the invention.

FIG. 3 is a table of system current and charging time according to an embodiment of the invention. As shown in FIG. 3, according to an embodiment of the invention, the supply voltage VIN can merely supply 7.4 W and the first output voltage VOUT1 outputted by the voltage adjustment unit 115 is 5V. For example, when the power consumption information SPC transmitted by the power detection module 116 in FIG. 1 is 0.1V, it represents that the first device 110 in FIG. 1 is engaged with the second device 120 in FIG. 1, and the system current IS is 0.5 A. That is, the residual of the supply power is 7.4−(5*0.5)=4.9 W for charging both the first battery 114 in FIG. 1 and the second battery 123 in FIG. 1, such that the first control module 113 sets the safety timer 117 to be 16 hours according to the power consumption information SPC. After the safety timer 117 finishes counting 16 hours, the first control module 113 stops the first charging unit 112 to charge the first battery 114, and the second control module 121 stops the second charging unit 122 to charge the second battery 123.

According to an embodiment of the invention, the first battery 114 and the second battery 123 belong to the same type of battery, and it takes 8 hours with 4.9 W charging power to charge either the first battery 114 or the second battery 123 from the capacity of 0% to 100%. As shown in FIG. 3, with 4.9 W charging power, it takes twice as long, i.e. 2×8=16 hours, to charge both the first battery 114 and the second battery 123.

Likewise, when the power consumption information SPC transmitted by the power detection module 116 of FIG. 1 is 0.24V, it represents that the system current IS is 1.2 A, i.e. the first control module 113 sets the safety timer 117 to be 48 hours according to the power consumption information SPC being 0.24V. According to an embodiment of the invention, after the safety timer 117 finishes counting, the first control module 113 would set the safety timer 117 again according to the power consumption information SPC.

Figure 4:
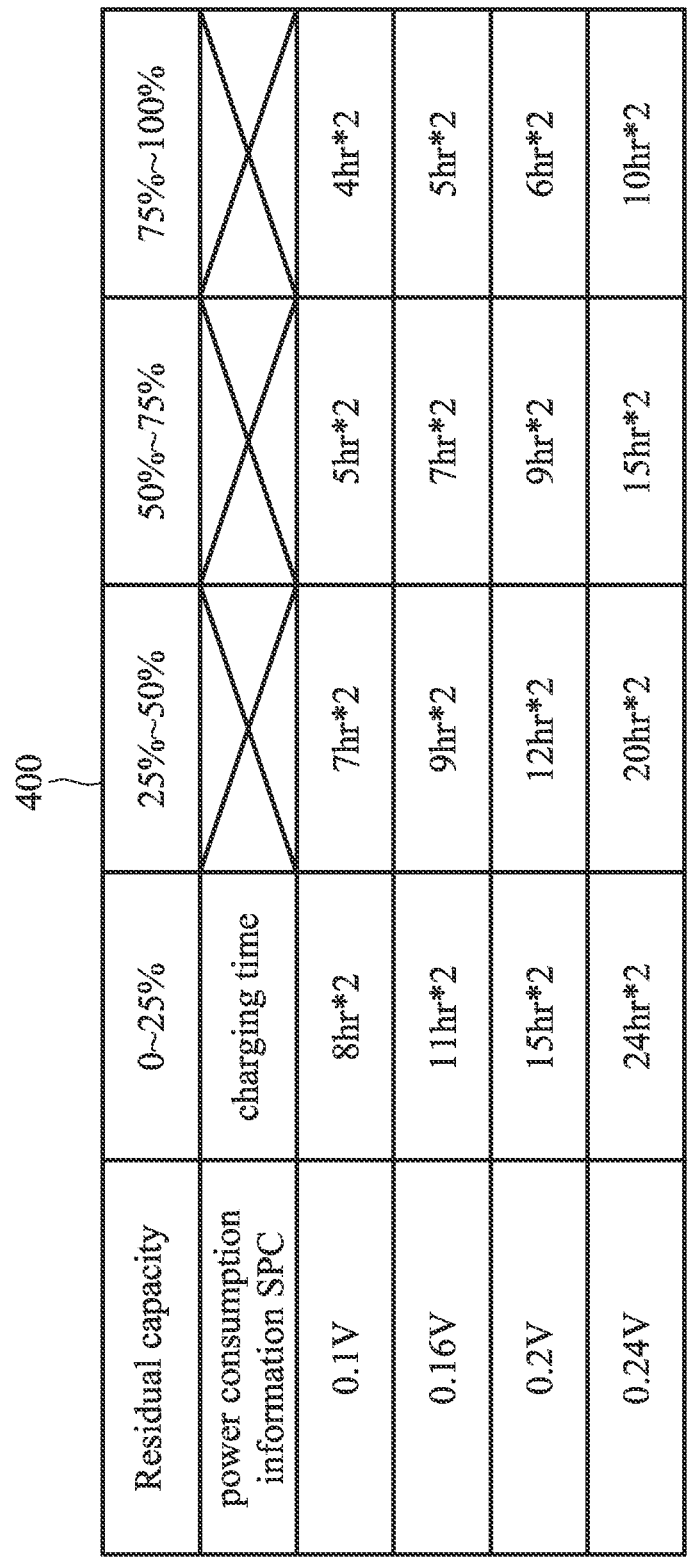
FIG. 4 is a table of system current, residual capacity, and charging time according to an embodiment of the invention.

FIG. 4 is a table of system current, residual capacity, and charging time according to an embodiment of the invention as shown in table 400. Because the probability of the residual capacities of the first battery 114 and the second battery 123 both being 0% is very low, that would be dangerous when the charging time is merely set according to the power consumption information SPC, and the charging is not stopped. To simplify the description, it is assumed herein that the residual capacities of the first battery 114 and the second battery 123 are the same. As shown in FIG. 4, the first control module 113 further sets the charging time of the safety timer 117 according to the first battery information SBAT1 of the first battery 114 and the second battery information SBAT2 of the second battery 123.

According to an embodiment of the invention, when the power consumption information SPC received by the first control module 113 is 0.24V and the residual capacities are both 40% according to the first battery information SBAT1 and the second battery information SBAT2, the first control module 113 has to set the charging time to be 40 hours, i.e. 2×20=40 hours, according to the information of FIG. 4.

Figure 5:
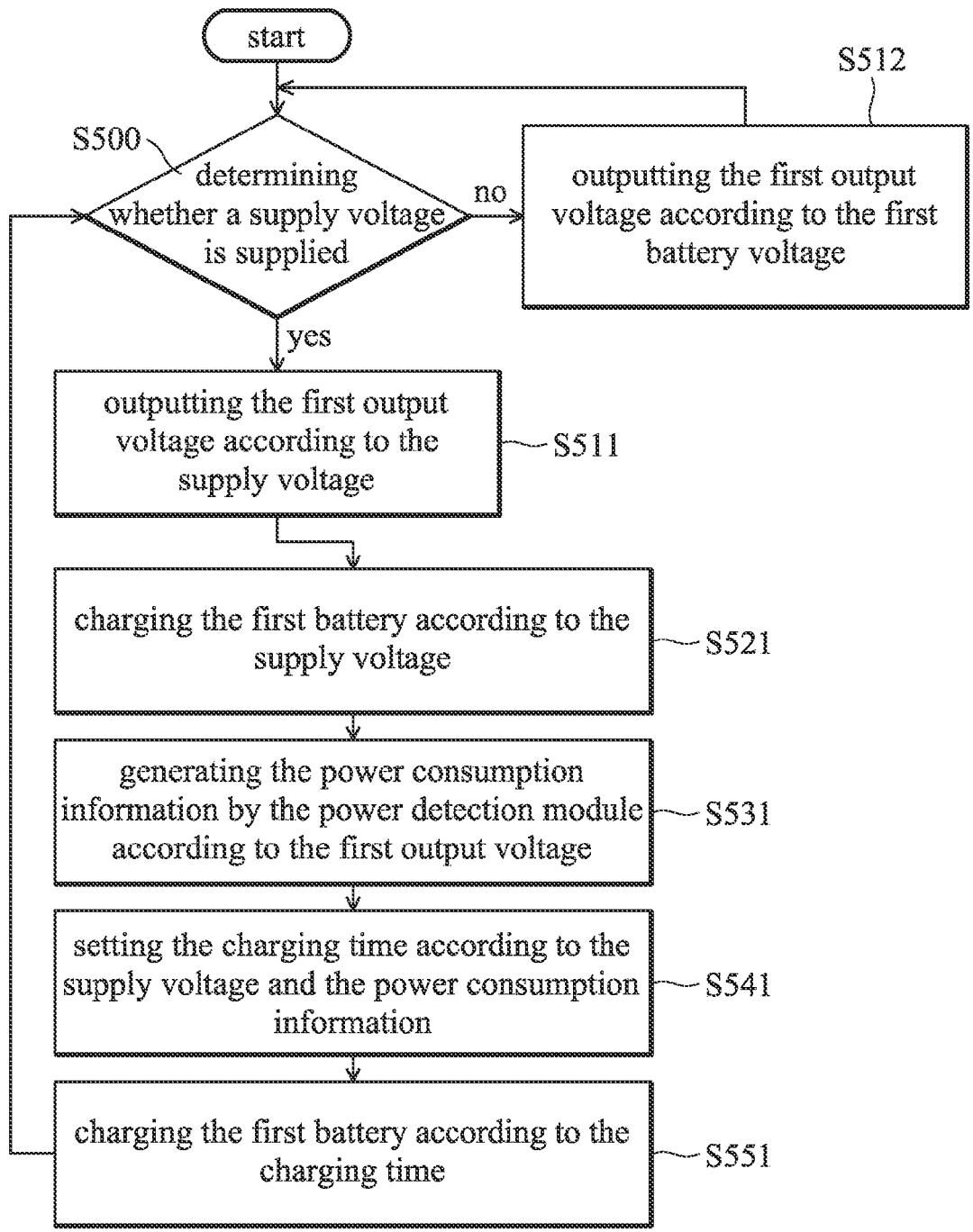
FIG. 5 is a flow chart of a charge method according to an embodiment of the invention.

FIG. 5 is a flow chart of a charge method according to an embodiment of the invention. At the beginning, the multiplexer determines whether the supply voltage VIN has been applied or not (S500). If the multiplexer 111 determines that the supply voltage VIN has been applied, the multiplexer 111 provides the supply voltage VIN for the voltage adjustment unit 115 to output the first output voltage VOUT1 (S511). If not, the multiplexer 111 provides the first battery voltage VBAT1 of the first battery 114 for the voltage adjustment unit 115 to output the first output voltage VOUT1 (S512). After a predetermined period, the multiplexer 111 determines whether the supply voltage VIN has been applied again. When the supply voltage VIN is detected by the first control module 113, the first control module 113 further controls the first charging unit 112 to charge the first battery 114 according to the supply voltage VIN (S521), and the power consumption SPC is generated by the power detection module 116 according to the first output voltage VOUT1 and the system current IS (S531). The first control module 113 sets the charging time according to the supply voltage VIN and the power consumption information SPC (S541). Further, the first control module 113 controls the first charging unit 112 to charge the first battery 114 according to the charging time (S551). After the charging time, the multiplexer 111 determines whether the supply voltage VIN has been applied again.

Figure 6:
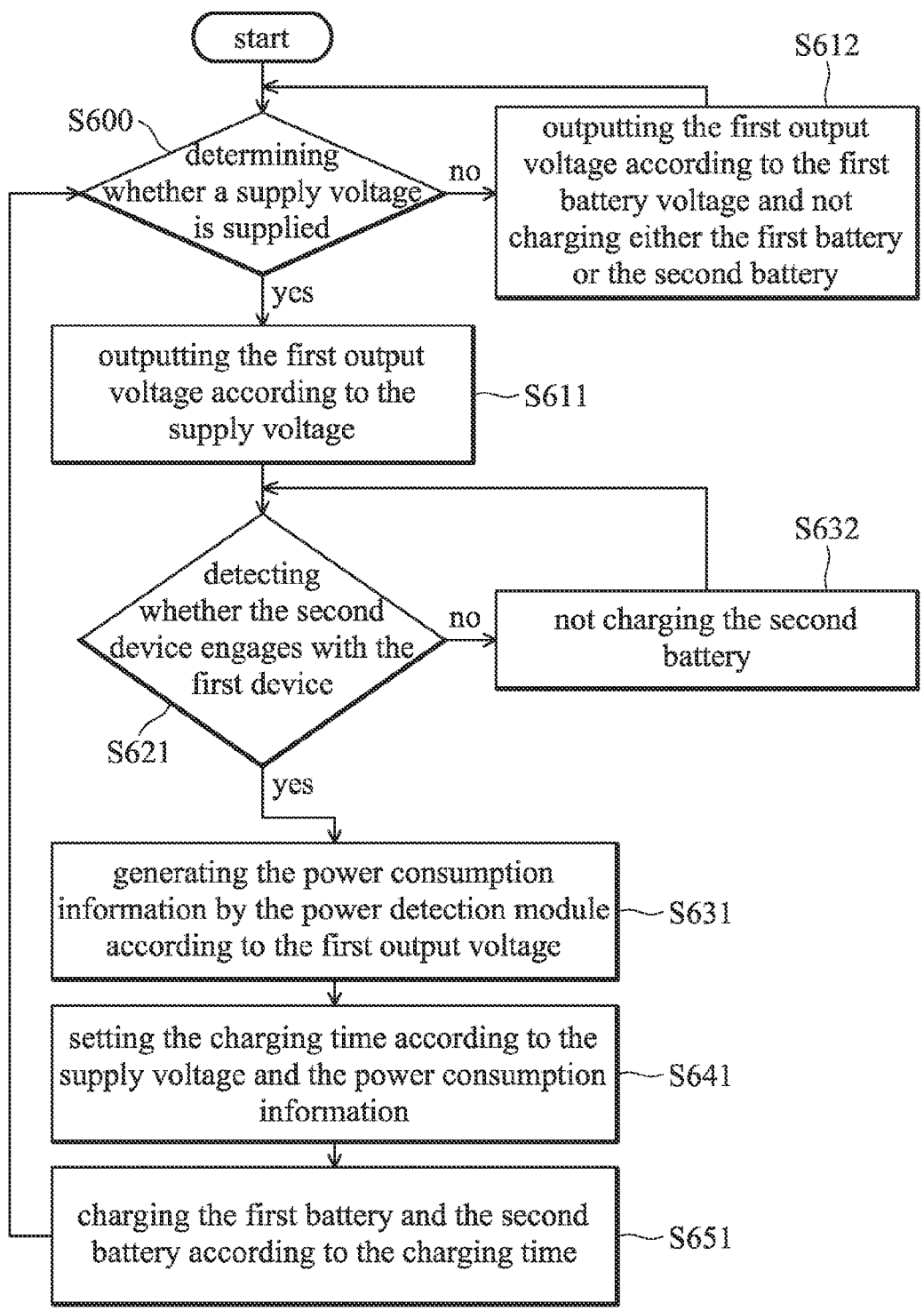
FIG. 6 is a flow chart of a charge method according to another embodiment of the invention.

FIG. 6 is a flow chart of a charge method according to another embodiment of the invention. Refer to FIG. 6 and FIG. 1 for the following descriptions. The multiplexer 111 determines whether the supply voltage VIN has been applied (S600). If the multiplexer 111 determines that the supply voltage VIN has been applied, the multiplexer 111 provides the supply voltage VIN for the voltage adjustment unit 115 to output the first output voltage VOUT1 (S611). If not, the multiplexer 111 provides the first battery voltage VBAT1 of the first battery 114 for the voltage adjustment unit 115 to output the first output voltage VOUT1, and either the first battery 114 or the second battery 123 is charged (S612). After a predetermined period, the multiplexer 111 determines whether the supply voltage VIN has been applied again. The second control module 121 detects whether the second device 120 is engaged with the first device 110 according to the first output voltage (S621). When the second control module 121 detects that the second device 120 is engaged with the first device 110, the power consumption information SPC is generated by the power detection module 116 according to the first output voltage VOUT1 (S631). When the second control module 121 detects that the second device 120 is not engaged with the first device 110, the second control module 121 controls the second charging unit 122 to not charge the second battery 123 (S632). After a predetermined period, the second control module 121 detects whether the second device 120 is engaged with the first device 110 again. The first control module 113 sets the charging time according to the supply voltage VIN and the power consumption information SPC (S641). The first control module 113 charges the first battery 114 according to the charging time, and the second control module 121 charges the second battery 123 according to the charging time (S651).

Figure 7:
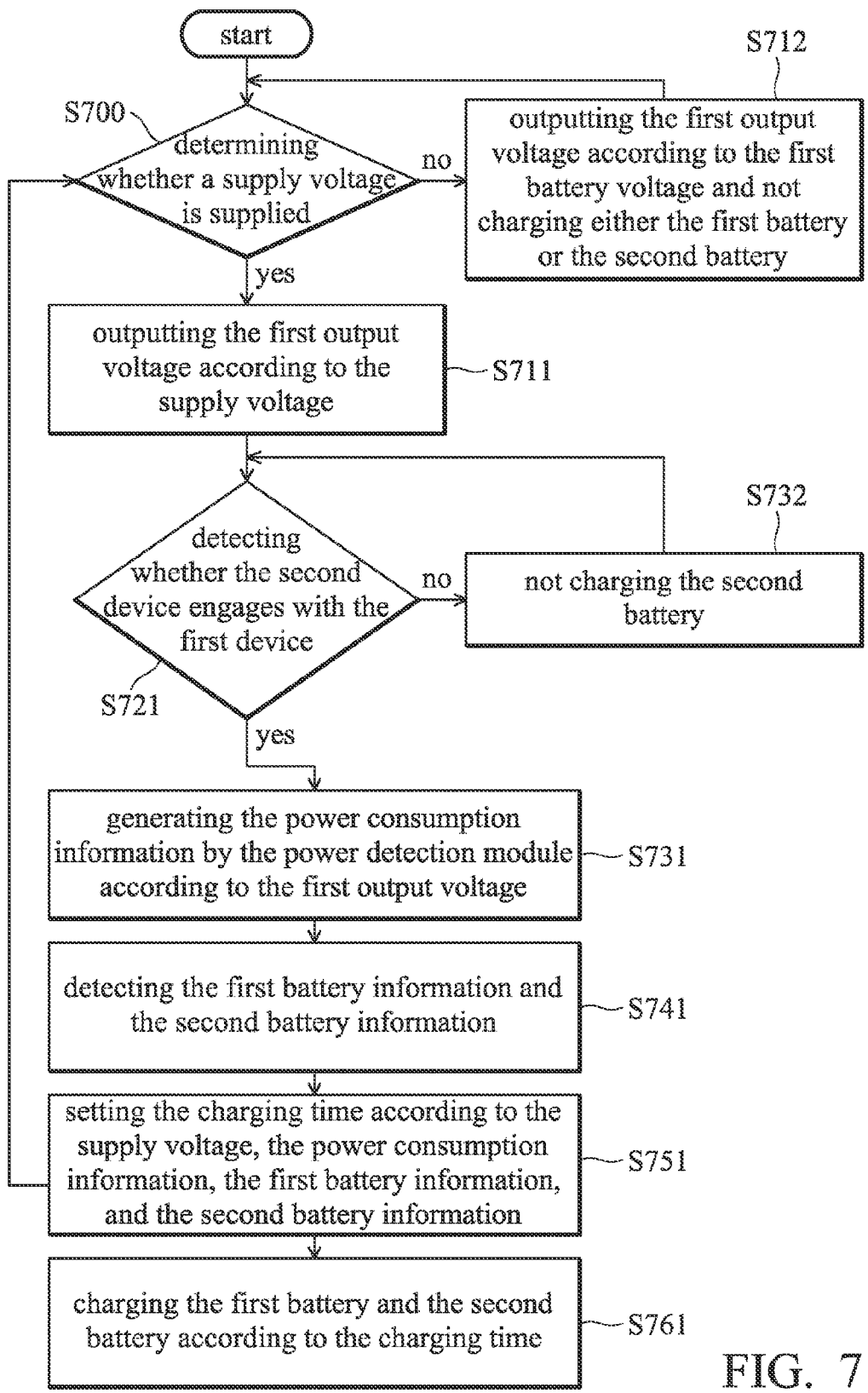
FIG. 7 is a flow chart of a charge method according to yet another embodiment of the invention.

FIG. 7 is a flow chart of a charge method according to yet another embodiment of the invention. Refer to FIG. 7 and FIG. 1 for the following descriptions. Comparing FIG. 6 and FIG. 7, the difference is that the first control module 113 detects the first battery information SBAT1 of the first battery 114 and the second control module 121 detects the second battery information SBAT2 of the second battery 123 (S741). Then, the first control module 113 sets the charging time according to the supply voltage VIN, the power consumption information SPC, the first battery information SBAT1, and the second battery information SBAT2. The remaining steps are the same as FIG. 6.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
   a first device, comprising:
   a first battery;
   a first charging unit, charging the first battery according to a supply voltage and a first charging enable signal;
   a first voltage adjustment unit, outputting a first output voltage according to the supply voltage or a first battery voltage of the first battery;
   a power detection module, generating a power consumption information according to the first output voltage; and
   a first control module, setting a charging time according to the supply voltage and the power consumption information, wherein the first control module generates the first charging enable signal to control the first charging unit to charge the first battery according to the charging time.

2. The electronic device of claim 1, further comprising a multiplexer selectively outputting the supply voltage or the first battery voltage to the first voltage adjustment unit, wherein the multiplexer outputs the supply voltage to the first voltage adjustment unit when the supply voltage is received, and the multiplexer outputs the first battery voltage to the first voltage adjustment unit when the supply voltage is not received.

3. The electronic device of claim 1, further comprising a second device detachably engaging with the first device, comprising:
   a second battery, outputting a second battery voltage;
   a second charging unit, charging the second battery according to a second charging enable signal and the first output voltage; and
   a second control module, outputting the second charging enable signal to control the second charging unit to charge the second battery according to the first output voltage and the charging time when the first device and the second device is engaged with each other.

4. The electronic device of claim 3, wherein the first control module sets the charging time according to a lookup table, wherein the lookup table records the power consumption information and the charging time corresponding to the power consumption information.

5. The electronic device of claim 4, wherein the first control module further detects the first battery information of the first battery, and the control module sets the charging time according to the supply voltage, the power consumption information, and the first battery information.

6. The electronic device of claim 5, wherein the second control module further detects the second battery information of the second battery, and the first control module further sets the charging time according to the supply voltage, the power consumption information, the first battery information, and the second battery information.

7. A charging method, adopted in an electronic device, wherein the electronic device comprises a first device which comprises a first battery, comprising:
   determining whether a supply voltage has been provided;
   charging the first battery according to the supply voltage when the supply voltage has been provided;
   outputting a first output voltage according to the supply voltage;
   generating a power consumption information according to the first output voltage by a power detection module;
   setting the charging time according to the supply voltage and the power consumption information; and
   charging the first battery according to the charging time.

8. The charging method of claim 7, wherein the first output voltage is outputted according to a first battery voltage of the first battery when the supply voltage has not been provided.

9. The charging method of claim 7, wherein the electronic device further comprises a second device which comprises a second battery, comprising:
   detecting whether the second device is engaged with the first device;
   charging the second battery according to the first output voltage and the charging time when the second device is engaged with the first device; and
   not charging the second battery when the second device is disengaged from the first device.

10. The charging method of claim 9, wherein the charging time is set according to a lookup table which records the power consumption information and the charging time corresponding to the power consumption information.

11. The charging method of claim 10, further comprising detecting a first battery information of the first battery and setting the charging time according to the supply voltage, the power consumption information, and the first battery information.

12. The charging method of claim 11, further comprising detecting a second battery information of the second battery and setting the charging time according to the supply voltage, the power consumption information, the first battery information, and the second battery information.

* * * * *